Feb. 26, 1952  D. F. JONES ET AL  2,586,826
CONTROL FOR HEATING APPARATUS
Filed Dec. 22, 1947  2 SHEETS—SHEET 2
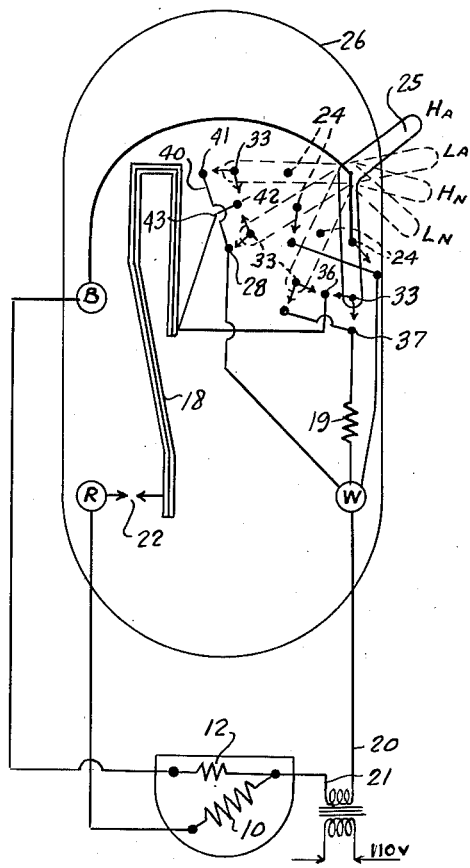
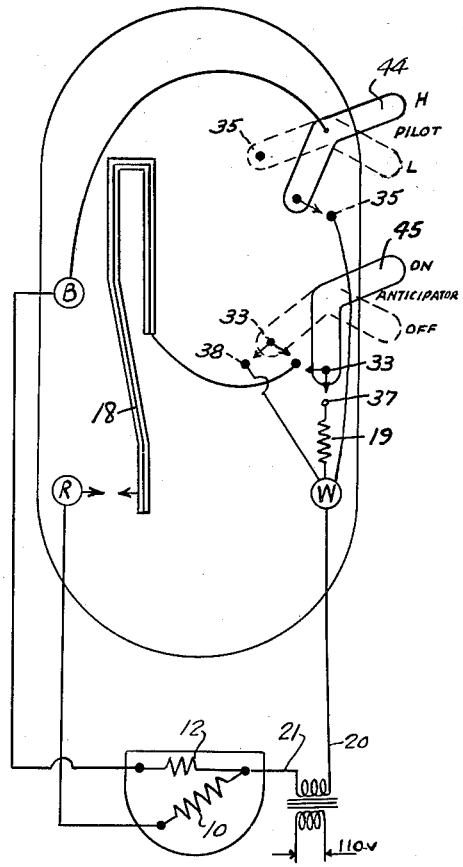
INVENTORS
Basil D. Figg
BY Don F. Jones
ATTORNEYS Patented Feb. 26, 1952

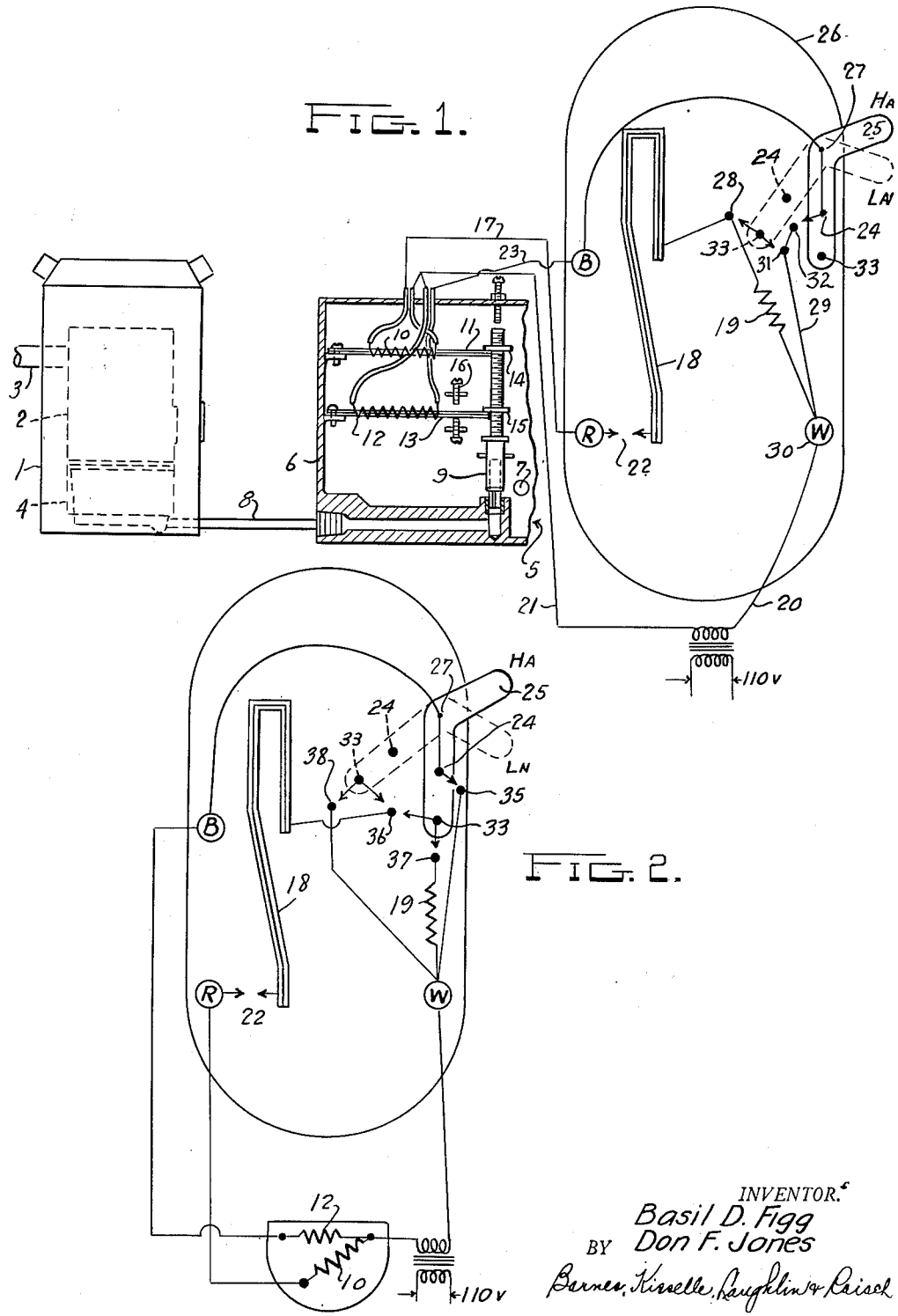

2,586,826

UNITED STATES PATENT OFFICE 2,586,826

CONTROL FOR HEATING APPARATUS

Don F. Jones and Basil D. Figg, Lansing, Mich., assignors to Motor Wheel Corporation, Lansing, Mich., a corporation of Michigan Application December 22, 1947, Serial No. 793,218

6 Claims. (Cl. 236—68)

This invention relates to a control for heating apparatus.

It is common practice in space heating apparatus to control the feed of fuel to the burner by means of a thermostat placed in the space or room to be heated. Such an apparatus is shown in the Miller Patent 2,348,143.

It is also common practice to equip the room thermostat with a small electrical heater which is known as an anticipator. The purpose of the anticipator is to add heat to the bimetal bar of thermostat each time the thermostat closes the fuel control circuit. A thermostat equipped with an anticipator will operate satisfactorily with a one-quarter to a one-half degree differential. Without the anticipator the thermostat normally operates with a two degree differential. If the heating apparatus, such as the automatic oil burning heating system shown in the Miller Patent 2,348,143, is operating under the control of a room thermostat having a one-half degree differential, it is continuously turning off and turning on at rather close intervals. This frequent turning on and off at short intervals causes all of the controls used with the furnace, such, for example, as the switch controlling the fan motor and the controls for the oil feed, to start and stop often. This frequent turning on and off shortens the life of these controls.

If a thermostat having a two degree differential is used in cold weather, one obtains what is known as a "cold 70" which is well known to the heating industry and which is not desirable. Also when it is cold outdoors it is desirable to have a small amount of heat continuously from the heating apparatus and consequently the oil burning apparatus is provided with an oil control and a selector switch which is used to change the low fire from a mere pilot flame to a low clean fire which normally produces about one-quarter of the heat output or capacity of the burner at high fire.

It is an object of this invention to produce a control for a space heating apparatus which will produce the desired substantially uniform temperature conditions in the space being heated throughout all seasons of the year and yet which will have a longer life than the heating control systems now in use. This object is achieved by arranging the electrical circuit of the heating system so that the anticipator will operate at only selected intervals.

We have discovered that in the fall and spring when only a small amount of heat is needed to keep the house up to the temperature desired and the outside temperature is not much lower than the room temperature desired, it is entirely satisfactory to have the room thermostat operate at a two degree differential. Also at night during sleeping hours it is desirable to have the room thermostat operate at the two degree differential. It is also satisfactory during the fall and spring seasons, as well as the night during sleeping hours, to have the burner operate from pilot to high fire and from high fire back to pilot. However, when it is cold outdoors, such as occurs during the winter season, it is not satisfactory to have the room thermostat operate with a two degree differential in room temperature and therefore it is desirable to use the anticipator in connection with the room thermostat so that the temperature of the room being heated will not vary more than one-half degree from the temperature desired.

This invention contemplates a control for a heating system which will accomplish all of the above desired results.

In the drawings:

Fig. 1 is a schematic showing of an oil burning space heating apparatus equipped with our improved control.

Figs. 2, 3 and 4 each schematically shows a modified form of our control.

The invention is illustrated in the drawing as applied to a warm air furnace 1 having a conventional heat exchanger 2 therein with an outlet pipe 3 to the stack. Heat is supplied to the heat exchanger 2 by means of a vaporizing oil burner 4 such as shown in the Valjean Patent 2,073,270. Fuel is fed to burner 4 from a source of supply (not shown) through a fuel control 5 which regulates the rate of flow of oil to the burner.

The fuel oil control comprises a housing 6 connected to a fuel supply line 7 and a fuel outlet line 8 to the burner 4. The oil control is provided with a valve 9 which controls the flow of fuel from the housing into line 8.

Valve 9 has three settings; namely, a low pilot setting wherein merely enough fuel flows through line 8 to the burner to maintain a pilot flame, a low clean fire or high pilot setting wherein sufficient oil is supplied to the burner so that the burner produces about one-quarter of the heat output of the burner when burning at high fire, and a high fire setting wherein sufficient oil is supplied to the burner so that it burns at its highest heat output capacity. To accomplish these three settings of valve 9, control 5 is provided with two heat motors.

The high fire heat motor comprises a thermostatic bimetal strip 11 with a heating coil 10. The low clean fire (high pilot) motor comprises a thermostatic bimetal strip 13 and a heating coil 12. Bimetal strip 11 when heated by heating coil 10 flexes upwardly and acts against shoulder 14 on valve 9 to raise valve 9 to its high fire position. Bimetal strip 13 when heated by coil 12 bends upwardly and acts against shoulder 15 on valve 9 to open the valve to low clean fire position. The upward flexing or bending of strip 13 is limited by stop 16. When both heat motors are deenergized, that is, when no current is flowing through either coil 12 or coil 10, then valve 9 will be in low pilot position.

The electrical control circuit for the high fire heat motor includes heating coil 10, line 17, bimetal thermostat 18 situated in the room or space being heated, anticipator heating coil 19 connected into one side 20 of the conventional 20 volt thermostat service line. The other side of the service line is designated 21. The anticipator 19 when energized heats bimetal member 18 and therefore speeds up opening of contacts 22.

The low clean fire circuit includes heating coil 12 which is connected into side 21 of the 20 volt service line and by means of line 23 with contact 24 on switch arm 25 which is pivoted in housing 26 as at 27. A contact 28 is provided in line 20 between anticipator coil 19 and thermostat 18. A shunt line 29 connects into line 20 as at 30 and is provided with contacts 31 and 32 in series. Switch arm 25 is also provided with a contact 33.

When switch arm 25 is in the full line position, indicated by HA, contacts 24 and 32 are together in electrically conducting relation and the high pilot heating element 12 is energized continuously and the anticipator is in series circuit with the high fire element 10 and is energized each time thermostat 18 closes contacts 22. If the pilot selector switch 25, which is a manually operated switch, is now shifted to the dotted line position indicated by LN, then contact 33 bridges contacts 31 and 28 so that the anticipator 19 is shorted or shunted out and when the pilot selector switch 25 is in LN position the circuit is broken between contacts 32 and 24 and therefore high pilot element 12 is deenergized or cut out of the circuit. To recapitulate: When the pilot selector switch 25 is set for high pilot (HA position), then the anticipator coil 19 is in series with high fire element 10 but when the pilot selector switch 25 is set for low pilot (LN), then anticipator 19 is shorted or shunted out.

In the modification shown in Fig. 2, when the pilot selector switch 25 is set for high pilot (HA position), then contact 35 closes against contact 24 and the circuit through high pilot element 12 is closed and at the same time the anticipator 19 is in series with the high fire element 10 because contact 33 bridges contacts 36 and 37. If the selector switch is now set for low pilot (LN position), then the contact between contacts 24 and 35 is broken thus cutting out the high pilot coil 12 and also the contact between contacts 33, 36 and 37 is broken cutting anticipator 19 out of the circuit and simultaneously contact is made between contacts 33, 36 and 38 which places the thermostat 18 in series with high fire heating element 10.

To recapitulate: In the form shown in Fig. 2 the anticipator 19 is in series with the high fire element 10 when the selector switch is set for high pilot (HA position) but the anticipator is out of circuit when the selector switch is set for low pilot (LN).

In the modification shown in Fig. 3 the pilot selector switch has four positions. When the selector switch 25 is set for high pilot (HA position), then the high pilot heating element 12 is in circuit with lines 20, 21 and the anticipator element 19 is in series with the high fire element 10 because contact 33 bridges contacts 37 and 36. When the selector switch is set for low pilot (LN position), then the element 12 is deenergized or out of circuit and the anticipator 19 is also out of circuit because line 20 is now connected with thermostat 18 through contact 28, line 40, contact 41, contact 42 and line 43. In LN position of switch 25 contact 33 bridges contacts 41 and 42. In the intermediate position (HN) the manual switch 25 is set for high pilot and the anticipator is out of circuit and in the position (LA) manual switch 25 is set for low pilot with anticipator 19 in series with high fire element 10.

In the modification shown in Fig. 4 two switches are used. The one switch 44 controls the pilot selector circuit and the other switch 45 controls the anticipator circuit. When the pilot switch 44 is in the full line position (Fig. 4), then the high pilot element 12 is energized or in circuit with the service line 20, 21. When the anticipator switch 45 is in the full line position, then the anticipator 19 is in series circuit with the thermostat 18 and the high fire element 10. When the pilot switch 44 is shifted to the dotted line position, then the high pilot element 12 is cut out of the circuit. When anticipator switch 45 is shifted to the dotted line position, then the anticipator 19 is cut out of the circuit. Thus, with these two switches we can obtain four different combinations which are the same as the combinations obtainable with the modification shown in Fig. 3 described above.

From the above description of our apparatus it is evident that if the temperature is cold outdoors, say, below 32° F., and the owner of the home being heated desires to sit down and become comfortable, he will turn the pilot selector switch to HA position so that the anticipator is in play or in the circuit when the pilot is on high pilot. With the anticipator in play, the number of cycles of the furnace will increase materially and prevent the so-called "cold 70" or stratification and will cause the heat output of the furnace to more nearly approximate the heat loss in the house over short periods of time. The anticipator will cause the cycles to be shorter and more of them and the switching equipment and the electric motor and the blower will be caused to stop and start many more times, therefore shortening their life, but such shortened life of these parts can be avoided by cutting the anticipator out of the circuit, by throwing the pilot selector switch to the LN position when the weather is mild out doors or when people are standing up or working around the house or when the occupants of the home are sleeping or when the house is unoccupied. The anticipator when used under such proposed conditions would not be in operation more than about ten percent of the time. This tremendous decrease in the operation of the switching and other mechanism affected by the on and off cycle of the heating apparatus will materially increase the life of the equipment.

We claim:

1. In a control device for regulating the supply of liquid fuel to a liquid fuel burner, the combination comprising a liquid fuel supply chamber having a fuel outlet, a valve for regulating flow through said outlet for low pilot, high pilot and high fire operation, the said valve being normally in low pilot position, a heat motor which when energized places the valve in high fire position, a second heat motor which when energized places the valve in high pilot position, a room thermostat including a thermostatic bimetal element in series circuit with, and for controlling the energization of, the first of said motors, a source of current, an anticipating heating coil in heat exchange relation with said room thermostat, a switch selectively positionable in either of two positions, the said switch in the one position placing the high pilot heat motor in circuit with said source of current and when said switch is in such position the anticipating heating coil is in series circuit with said thermostat and energizable to heat said thermostat, said switch when in its other position cutting the high pilot heat motor out of circuit with said source of current and placing the thermostat in direct circuit with said source of current whereby the anticipating heating element is ineffective.

2. The combination as set forth in claim 1 wherein said switch in the one position connects said bimetal element with said source of current through said anticipating heating element and in the other position connects the bimetal element directly with said source of current and cuts out said anticipating heating element.

3. The combination as set forth in claim 1 wherein the anticipating heating element is in series circuit with said source of current and bimetal element and a shunt circuit is provided between the bimetal heating element and the source of current which is completed when the switch is in one of its positions to thereby shunt out the anticipating heating element.

4. In a control device for regulating the supply of liquid fuel to a liquid fuel burner comprising a liquid fuel supply chamber having a fuel outlet, a valve for regulating flow through said outlet for low pilot, high pilot and high fire operation, the said valve being normally in low pilot position, a heat motor which when energized places the valve in high fire position, a second heat motor which when energized places the valve in high pilot position, a room thermostat in series circuit with, and for controlling the energization of, the first of said motors, a source of current, an anticipating heating element in heat exchange relation with said room thermostat, a switch selectively positionable in any of four positions, the said switch in the one position placing the high pilot heat motor in circuit with said source of current and the anticipating heating element in series circuit with said thermostat and energizable to heat said thermostat, said switch when in a second position cutting the high pilot heat motor out of circuit with said source of current and placing the thermostat in direct circuit with said source of current whereby the anticipating heating element is ineffective, said switch having a third position wherein the high pilot motor is connected with said source of current and energized and the anticipating heating coil is out of circuit, and said switch having a fourth position wherein the anticipating heating element is in series circuit with the thermostatic element and the high fire motor, and the high pilot motor is out of circuit with said source of current.

5. In a control device for regulating the supply of fluid fuel to a burner, the combination comprising means for admitting sufficient fuel to produce a low pilot, a first electrically actuated means for admitting sufficient fuel to the burner for producing a high pilot, a second electrically actuated means for admitting sufficient fuel to the burner for producing a high fire, a room thermostat including a thermostatic switch, said thermostatic switch being connected with said second electrically actuated means, an anticipating electrical heating element in heat exchange relation with said room thermostat, a source of current, and a manually operable switch selectively positionable to either of two positions, said manually operable switch in one position connecting said thermostatic switch directly with said source of current and thereby rendering said anticipating element inoperable, said manual switch in said other position placing the anticipating element in series with said thermostatic switch and said source of current and connecting said source of current with said first electrically actuated means.

6. In a control device for regulating the supply of fluid fuel to a burner, the combination comprising a fuel supply chamber, a valve for regulating the flow of fuel from said chamber to the burner, said valve being normally positioned in low-pilot position, a first electrically actuated means for placing the valve in high-pilot position, a second electrically actuated means for placing the valve in high-fire position, a room thermostat including a thermostatic switch, a source of current, said second electrically actuated means being connected between one side of said thermostatic switch and said source of current, an anticipating heating element in heat exchange relation with said thermostatic switch, and a manually operable switch positionable in either of two positions, said manual switch in one position connecting said source of current directly with the other side of said thermostatic switch and thereby rendering said anticipating element inoperable, said switch in another position connecting said source of current to said other side of said thermostatic switch through said anticipating element and also connecting said source of current with said first electrically actuated means.

DON F. JONES.
BASIL D. FIGG.

REFERENCES CITED

The following references are of record in the file of this patent:

UNITED STATES PATENTS

| Number | Name | Date |
|---|---|---|
| 1,700,661 | Appelberg | Jan. 29, 1929 |
| 2,052,635 | Leland | Sept. 1, 1936 |
| 2,234,288 | Smith et al. | Mar. 11, 1941 |
| 2,265,294 | Lange | Dec. 9, 1941 |
| 2,348,143 | Miller | May 2, 1944 |
| 2,421,953 | MacKendrick | June 10, 1947 |
| 2,425,686 | Porter | Aug. 12, 1947 |
| 2,464,346 | Richardson | Mar. 15, 1949 |